July 11, 1933.  G. W. BRETZ  1,917,493
LINE GUIDE
Filed Sept. 9, 1930
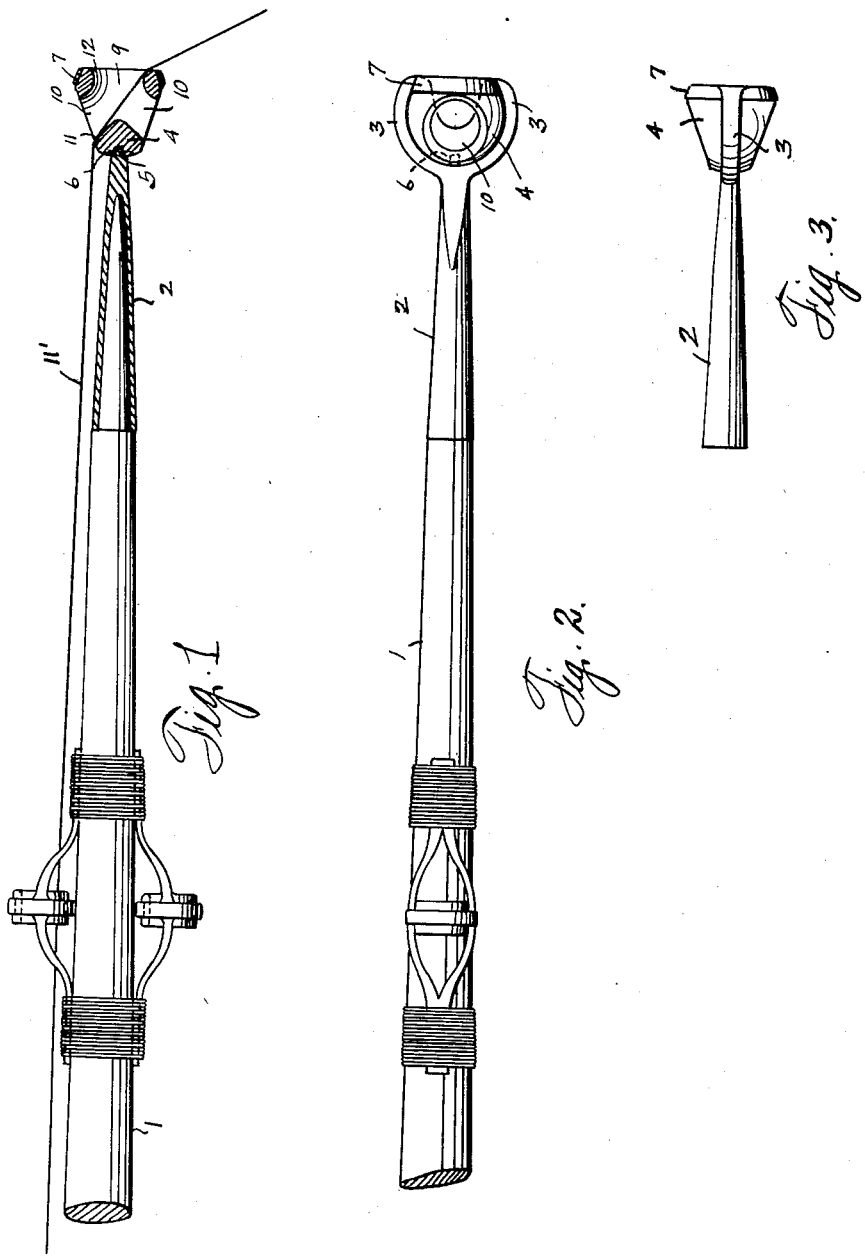

Patented July 11, 1933

1,917,493

UNITED STATES PATENT OFFICE

GEORGE W. BRETZ, OF GALVESTON, TEXAS

LINE GUIDE

Application filed September 9, 1930. Serial No. 480,700.

This invention relates to new and useful improvements in a line guide.

One object of the invention is to provide a novel type of guide, designed to be applied to the end of a fishing rod and through which the line carrying the hook works, the particular purpose being to provide a guide of the character described so shaped and constructed that the line will work against hard surfaces and will be held out of contact with the metal parts to the end that the guide will not become grooved or rendered rough or uneven by the friction on the line so that the line will not quickly wear and become weakened and break.

Another object of the invention is to provide in a fishing rod, a line guide having an insert of agate or other hard material presenting wearing faces for the line that will be smooth and will not cut or wear the line working therethrough.

A further feature of the invention resides in the provision of a line guide for fishing rods of such shape that the fishing line may be readily strung on either side of the rod.

With the above and other objects in view, the invention has particular relation to certain novel features of construction and arrangement of parts and use, an example of which is given in this specification and illustrated in the accompanying drawing wherein:

Figure 1 shows a fragmentary side view of the fishing rod showing the guide attached thereto in section.

Figure 2 shows a fragmentary view taken at right angles to that shown in Figure 1, and Figure 3 shows a detached view of the guide.

In the drawing, the numeral 1 designates the conventional type of fishing pole one end of which is reduced to receive the ferrule 2. This ferrule is preferably formed of metal and is suitably secured to the adjacent end of the pole, and the free end of the ferrule is bifurcated providing the opposite disposed outwardly curved arms 3. Fitted between these arms there is an agate 4 shaped to fit snugly between said arms and between the arms there is a projecting stud 5 which fits in a socket 6 of the agate, to assist in holding the latter in place. There is a band 7 preferably of metal which is fitted against the outer end of the agate 4 and is welded or otherwise secured to the free ends of the arms 3 thus providing additional means for clamping said agate in place.

In lieu of the agate any other hard wear resisting material may be used. The outer end of said agate 4 has a bore 9 which branches and forms the openings 10, 10 through opposite sides of the agate. The fishing line 11' may be threaded through either of the openings 10 and through the bore 9 and my thus be strung on either side of the fishing pole. The surfaces 11, 12, against which the line bears or works, are convex, the former holding the line out of contact with the metal part of the ferrule and the latter holding the line out of contact with the metal ring 7 and these surfaces 11, 12 are ground smooth, and being of wear resisting material will not be grooved or roughened by the line and will not cut or injure said line by reason of its friction, thereagainst. In this respect the guide will be a great improvement over fishing line guides now in common use.

The drawing and description disclose what is now considered to be a preferred form of the invention by way of illustration only while the broad principle of the invention will be defined by the appended claim.

What I claim is:

A line guide including a shank whose free end is bifurcated providing outwardly curved oppositely disposed arms, an agate fitted snugly between said arms, a band formed integrally with the outer ends of said arms and fitted against the outer portion of the agate, the outer end of said agate being provided with a bore which extends to and through each side of the agate between said arms, the walls of said bore being convex.

In testimony whereof I have signed my name to this specification.

GEORGE W. BRETZ.